No. 714,808. Patented Dec. 2, 1902.
H. LEMP.
VEHICLE FRAME.
(Application filed May 18, 1899.)
(No Model.) 2 Sheets—Sheet 1.

WITNESSES.
Edw. Williams, Jr.
A. F. Macdonald.

INVENTOR.
Hermann Lemp,
by Albert G. Davis
Atty.

THE NORRIS PETERS CO., PHOTO-LITHO., WASHINGTON, D. C.

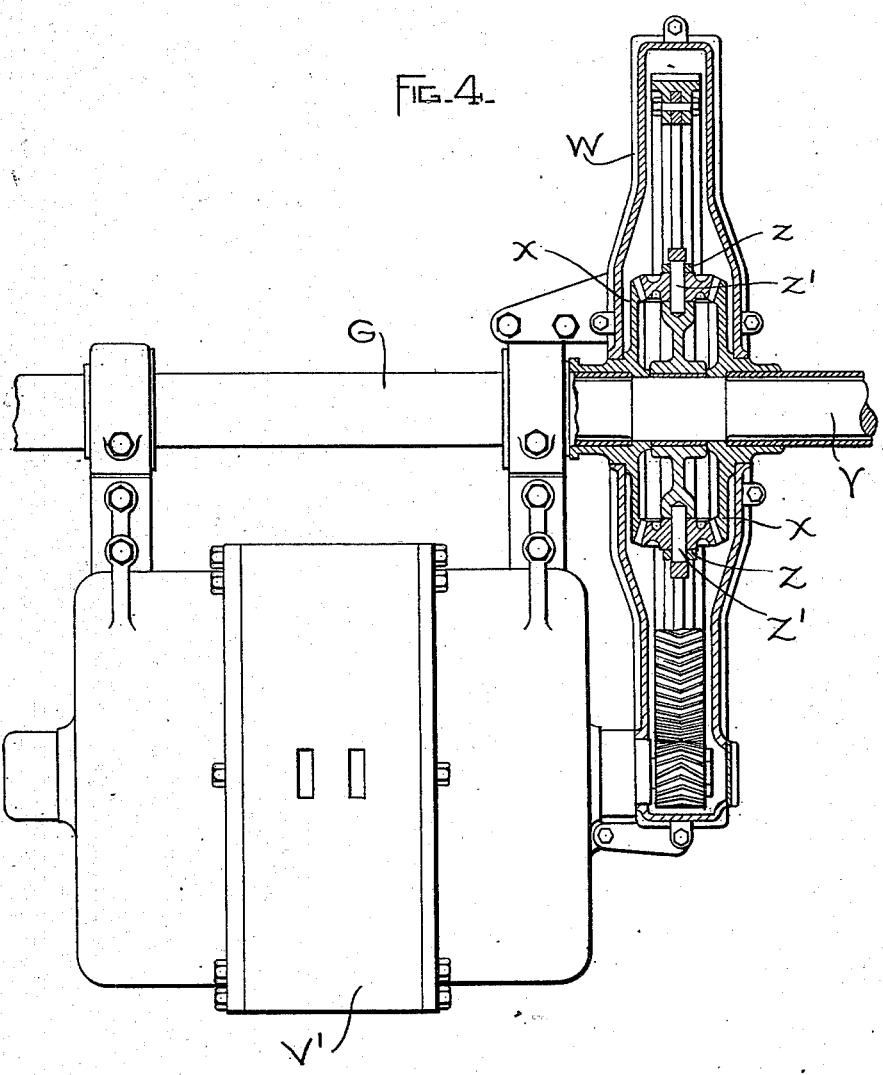

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

VEHICLE-FRAME.

SPECIFICATION forming part of Letters Patent No. 714,808, dated December 2, 1902.

Application filed May 18, 1899. Serial No. 717,265. (No model.)

*To all whom it may concern:*

Be it known that I, HERMANN LEMP, a citizen of the United States, residing at Lynn, county of Essex, State of Massachusetts, have invented certain new and useful Improvements in Vehicle-Frames, (Case No. 1,017,) of which the following is a specification.

The present invention relates to the construction of frames for vehicles, and more particularly to that class which are self-propelled. Vehicles of this class require a much stronger frame than do ordinary vehicles; and my invention has for its object to provide a vehicle-frame which shall be simple in construction, strong, and cheap to build.

The accompanying drawings show an embodiment of my invention, in which—

Figure 1:
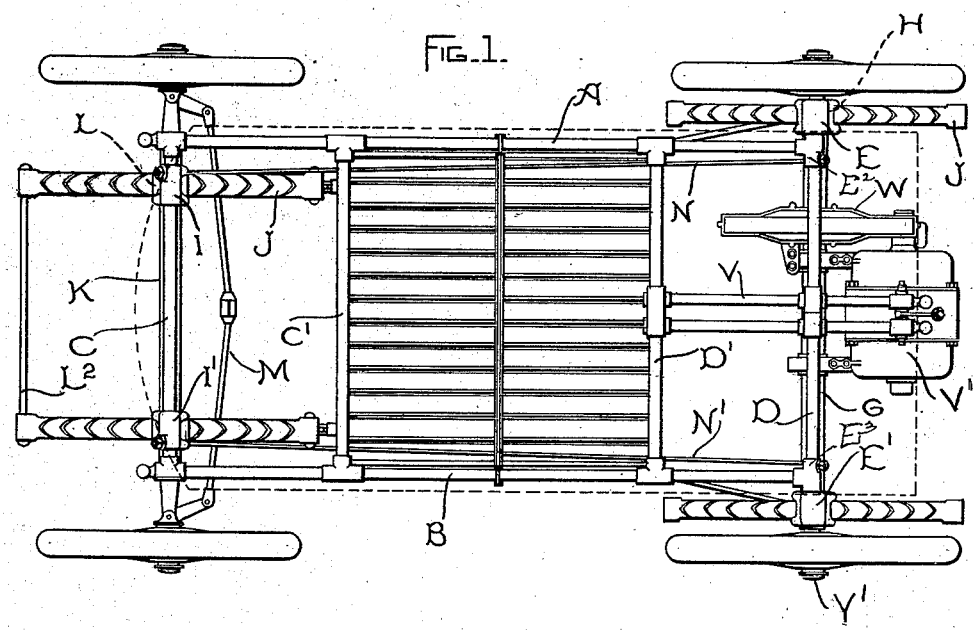
Figure 2:
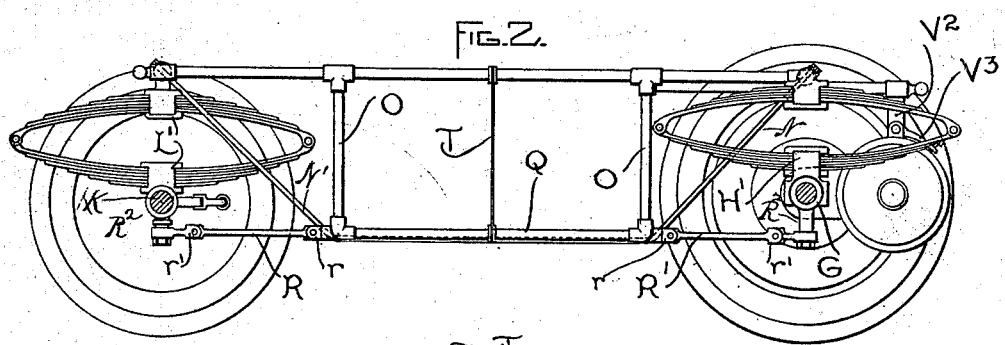
Figures 3, 5:
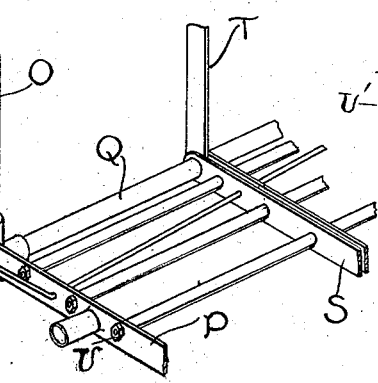

Figure 1 is a plan view of the frame of a vehicle. Fig. 2 is a side elevation with the wheels next to the observer removed. Fig. 3 is a perspective view showing the support for the battery. Fig. 4 is a detail view of the differential gearing, and Fig. 5 is a cross-section of one of the battery-rollers.

Extending longitudinally and in the same horizontal plane are two tubes or bars A and B. These are connected by two pairs of transverse members located at or near the ends thereof, the tubes C and C' uniting to form one pair and the tubes D and D' uniting to form the second pair. The vehicle being designed to carry a battery, the transverse tubes C' and D' have been so placed that they are directly over the ends of the battery-frame. This I have found to be a preferable construction, as it adds stability to the frame by bracing it through the central portion near where the weight of the battery is located; but, if desired, the tubes forming the pairs of transverse members can be moved much nearer together, the exact location of the tubes being immaterial, as the effect is the same.

Secured to the tube D at or near its ends and outside of the longitudinal frame-bars A B are two brackets E and E'. These brackets are designed to receive and clamp the upper part of the frame-supporting elliptic springs. The brackets E and E' may, if desired, be designed like the brackets I and I' to receive the ends of the trussed reaches N and N' in addition to the springs. Mounted on the axle G and arranged to receive and clamp the lower part of the elliptic springs are brackets H and H'.

The transverse member C is provided with a pair of spring-holding brackets I I', which are located inside of the bars A and B and are designed to receive and clamp the upper portion of the elliptic frame-supporting springs J. Mounted on the stationary axle K are two spring-holding brackets L and L', and the springs J, which are mounted therein, are tied together at one end by a rod $L^2$ to add rigidity to the structure.

The frame is braced longitudinally by two or more trussed reaches N and N'. The reach N extends between bracket I on one transverse member and a holder or union $E^2$ on a second transverse member. The reach N' extends between the bracket I' on the transverse member C and a holder or union $E^3$ on the transverse member D. Projecting downwardly from the frame are four posts O. These posts are united by a rectangular frame which supports the battery, the two posts on each side of the frame being united by tubes Q and the posts on opposite sides by bars P. The reaches N and N' are shown as passing through holes in the transverse battery-frame bars P (best shown in Fig. 3;) but any other form of support may be employed if desired. Owing to the reaches extending under the vehicle somewhat diagonally, the openings in the bars P for receiving them are not exactly in line, those in one bar being practically in line with the posts O and in the other bar slightly removed therefrom. This arrangement of parts constitutes a pair of trussed reaches, the tube A, reach N, and posts O forming one and the tube B, reach N', and posts O forming the other.

In order to increase the strength and rigidity of the frame and at the same time allow a certain freedom of movements of the parts, pivoted tie-rods R are employed between the lower portion of the battery-frame and axle K at one end and pivoted tie-rods R' between the opposite end of the battery-frame and the axle G on the other end. Extending downward from the spring-holding brackets are supports $R^2$, and the rods R and R' are mounted therein in such manner that they are capable of a limited amount of rotary movement in a horizontal plane. The rods R and R' are pivotally secured to the frame by joints r in such manner as to permit of movement of the parts in a vertical plane, and in addition to this are provided with pivoted joints r', also arranged to permit movement in a vertical plane. The parts as arranged constitute universal movement connections between the axles and the main and battery frames.

With the parts arranged as described one pair of wheels is supported by the transverse members D and D' and the other pair of wheels is supported by the transverse members C and C', the trussed reaches extending to the outside or end members and securely holding the parts of the frame in proper relation.

It will thus be seen that a frame of great rigidity is provided, yet one in which the parts are permitted a considerable freedom of movement.

The sides of the battery-frame are formed by the trussed reaches and the ends by the bars P and transverse members C' and D'. The tubes O and Q and the bars P are preferably electrically welded to the unions. The tubes may or may not be welded, as desired; but I have found that the welded joints produce most excellent results. The frame is braced through the center by the horizontal and parallel bars S and on the sides by the vertical bars T, which are provided with holes at the ends for the reception of the tubes forming the main vehicle-frame. Extending between the bars P and S and parallel with the side tubes Q are a number of bolts U, and surrounding these bolts are rollers U', over which the battery is moved, as shown in Fig. 5. The batteries being heavy, these rollers greatly facilitate the handling of them.

The steering-wheels are mounted on short axles, which axles are in turn mounted in vertical bearings and form the common double-axle suspension. The steering is accomplished by a suitable steering mechanism (not shown) through the rods M, which connect the short axles.

Sleeved on the axle G at one end and supported at the free end by the parallel rods V is an electric motor V' of any desired construction. The rods V are secured to the under side of the transverse frame-tubes D and D', and extending downward therefrom is a link $V^2$, having an extension $V^3$, carrying an adjusting-bolt in its outer end. This arrangement gives very satisfactory results, the elliptic springs which support the vehicle-body (the latter being shown in dotted lines) furnishing the proper amount of flexibility for the free or outer end of the motor. The motor-armature is provided with a pinion which meshes with a spur-gear forming a part of a differential gearing, the arrangement of parts being such that when the vehicle is traveling in a straight line both wheels are driven at the same speed, but when the vehicle is deflected therefrom one wheel will travel faster than the other. Surrounding the differential gears is a gear-case W, which protects them from dirt and water.

Referring to Fig. 4, the construction and arrangement of the gearing are shown. The axle G is tubular and is divided into two parts, each part being rigidly connected to a wheel and to a bevel-gear X. The parts of the axle are held together by a shaft Y, which is provided with nuts Y' on the ends to hold the driving-wheels in place. Sleeved on the shaft Y is a herring-bone spur-gear, and carried by the spokes of the gear is a pair of bevel-pinions which mesh with the bevel-gears X, carried by the tubular shaft. So long as the vehicle is traveling in a straight line the pinions Z do not rotate on their shafts Z', but do rotate around the shaft Y as a center. As soon, however, as the vehicle is deflected from a straight line—as in going around a corner, for example—one wheel travels faster than the other, and the gears X take care of this difference.

What I claim as new, and desire to secure by Letters Patent of the United States, is—

1. In a vehicle, the combination of a pair of axles, a frame, springs between the frame and the axle for supporting the frame, a battery-frame below the main frame, and a mechanical connection other than one of the springs between the battery-frame and one of the axles, which is capable of universal movement.

2. In a vehicle, the combination of a pair of axles, a main frame, a battery-frame below the main frame, springs between the battery-frame and the axle for supporting the frame, and rods capable of universal movement which connect the axles to the frame.

3. In a vehicle, the combination of an axle, a frame, springs for supporting the frame, a motor sleeved on the axle, a rigid rod or tube secured to the frame and extending outward away from the axle, and a rigid connection between the rod or tube and the outer or free end of the motor.

4. In a vehicle, the combination of an axle, a spring-supported frame mounted on the axle, a motor sleeved on the axle and extending outward away from the axle, a tube secured to the under side of the frame also extending outward and away from the axle, and a link pivotally connected to the tube and the motor for supporting the free end of the motor.

5. In an electrically-propelled vehicle, the combination of a main frame for supporting the body of the vehicle, a battery-frame secured to the under side of the main frame, and rollers carried by the frame over which the battery is moved.

6. In a vehicle, the combination of an axle, a frame, springs supporting the frame, a motor sleeved on the axle and non-elastic means connecting the motor to the spring-supported frame.

7. In a vehicle, the combination of an axle having an enlargement forming a bearing for the meeting ends of a tubular axle, a divided tubular axle mounted thereon and connected to the driving-wheel, a gear sleeved on the first-mentioned axle, bevel-gears secured to the adjacent ends of the tubular axle, and pinions carried by the gear which is sleeved on the first-mentioned axle, for permitting one of the driving-wheels to move at a different rate of speed from the other.

8. In a vehicle, the combination of a pair of axles, springs for supporting the frame, a frame for the body, a battery-frame carried by the first-mentioned frame and situated below it, and a motor which is supported by one of the axles.

9. In a vehicle, the combination of a pair of axles, wheels therefor, a frame mounted on the axles, and a battery-frame secured to and depending from the main frame and located between the wheels.

10. In a vehicle, the combination of a pair of axles, wheels therefor, a frame mounted on the axles, a battery-frame secured to the main frame and depending therefrom, and braces attached to the frames for preventing independent longitudinal movement.

11. In a vehicle, the combination of a frame, supports depending therefrom, a battery-carrying frame which unites the supports, and intermediate supports for the battery-frame.

12. A vehicle-frame comprising a trussed reach with a battery-frame located between the top and bottom members of the reach.

In witness whereof I have hereunto set my hand this 10th day of May, 1899.

HERMANN LEMP.

Witnesses:
DUGALD McKILLOP,
HENRY O. WESTENDARP.